(12) United States Patent
Menefee (10) Patent No.: US 6,412,965 B2
(45) Date of Patent: ***Jul. 2, 2002

(54) PORTABLE, UNIVERSAL, NON-DESTRUCTIVE AND STABLE DEVICE FOR VIEWING AN INFANT IN THE REAR SEAT OF A VEHICLE

(75) Inventor: Dennis H. Menefee, Casselberry, FL (US)

(73) Assignee: Parent PRoducts Corporation, Casselberry, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/881,191

(22) Filed: Jun. 14, 2001

Related U.S. Application Data

(63) Continuation-in-part of application No. 09/564,243, filed on May 4, 2000, now Pat. No. 6,264,340.

(51) Int. Cl.[7] .............................................. G02B 7/182
(52) U.S. Cl. ........................ 359/881; 359/844; 359/872; 248/474
(58) Field of Search ................................. 359/844, 857, 359/860, 862, 863, 865, 871, 872, 881; 248/474, 476, 477, 479

(56) References Cited

U.S. PATENT DOCUMENTS

| | | | |
|---|---|---|---|
| 4,549,790 A | 10/1985 | Harris, Jr. | |
| 4,702,572 A | 10/1987 | Cossey | |
| 4,733,956 A | 3/1988 | Erickson | |
| 4,902,118 A | 2/1990 | Harris | |
| 4,909,618 A | 3/1990 | Gardner | |
| 5,453,882 A | 9/1995 | Westman | 359/855 |
| 5,576,898 A | 11/1996 | Rubin | 359/841 |
| 5,668,526 A | 9/1997 | Collins | 340/326 |
| 6,039,455 A | 3/2000 | Sorenson | 362/142 |
| 6,120,155 A | 9/2000 | Brennan | 359/857 |
| 6,264,340 B1 * | 7/2001 | Menefee | 359/881 |

* cited by examiner

*Primary Examiner*—Mark A. Robinson
(74) *Attorney, Agent, or Firm*—Brian S. Steinberger; Law Offices of Brian S. Steinberger, PA (57) ABSTRACT

A device which enables a driver of a vehicle to monitor an infant in a rear seat by the rear view mirror of the vehicle, where the device is portable, universally applicable to passenger vehicles and non-destructive of the vehicle interior yet secure against vehicular vibration. The device consists of a non-threaded telescoping mast that is held into a selected position by a clip, and a mirror for viewing the infant which mast is positioned between the top of the backseat and the headliner secured by outward pressures from a backseat pad and an upper pivotal pad. The pivotal pad can be attached to the mast by a ball and socket for allowing 360 degrees of pivot.

19 Claims, 7 Drawing Sheets

PORTABLE, UNIVERSAL, NON-DESTRUCTIVE AND STABLE DEVICE FOR VIEWING AN INFANT IN THE REAR SEAT OF A VEHICLE

This invention relates to a device for viewing an infant in the rear seat of a vehicle and, more particularly, to a portable and universal infant viewing device employing an additional mirror stabilized between the roof and back seat of the vehicle, and this invention is a Continuation-In-Part of U.S. application Ser. No. 09/564,243 filed May 4, 2000, which is now U.S. Pat. No. 6,264,340.

BACKGROUND AND PRIOR ART

When traveling in a vehicle such as an automobile, a two seated truck, a van or the like, it is lawfully necessary to place an infant in the back seat of the vehicle providing safety to the infant.

However, problems are encountered when the infant is placed in the rear seat of the vehicle since it is often difficult, if not impossible, to view the infant properly and still enable the driver of the vehicle to maintain proper eye contact with the road.

Further, the law requires that infants be placed in a specially designed infant seat that is constructed and arranged so that the infant is facing the rear of the vehicle.

There are numerous United States patents disclosing the use of a back seat mounted infant seat with a forward facing viewing mirror aligned with the front rear-view mirror including:

Cossey, U.S. Pat. No. 4,702,572 which discloses a device for viewing an infant in the rear seat which device clamps with difficulty and prospective instability onto the top of the back seat and includes a telescopically mounted mirror which slopes downward so the driver can readily see the infant in the rear view mirror;

Westman, U.S. Pat. No. 5,453,882 shows another rear seat object viewing device mounted (for adequate stability it must be interior-destructively screwed into the vehicle interior) between the seat and the headliner having an adjustable (rear-view distorting) mast and slanted mirror to reflect an object into the rear mirror so the object can be seen by the driver;

Harris, U.S. Pat. No. 4,902,118 discloses another infant observation mirror strapped (with difficulty to impossibility) with poor security to the top of the rear seat in a position which makes it difficult to see the infant from the rear-view mirror;

Erickson, U.S. Pat. No. 4,733,956 shows yet another non-portable mirror system (not universal) with the mirror insecurely mounted to the rear window by an adhesive;

Rubin, U.S. Pat. No. 5,576,898 also involves a non-portable, rear-viewing system for a vehicle wherein the mirror is mounted in the headliner and folds down for use;

Harris, Jr., U.S. Pat. No. 4,549,790 similarly discloses a non-portable, rear-viewing system for a multiple seat vehicle which uses a circular mirror mounted directly to the interior rear of the vehicle;

Gardner, U.S. Pat. No. 4,909,618 discloses a non-portable rear seat viewing device having a mirror mounted on the shelf posterior to the rear seat with a light source around the perimeter of the mirror to light an infant's face at night while obscuring the driver's view out of the rear window; and, Collins, U.S. Pat. No. 5,668,526 discloses an infant monitoring system using a mirror mounted in a teddy bear or similar item which is mounted on the back seat rest and prospectively can be vibrated loose from it (non-secure) and which system requires changing the rear-view mirror to observe the infant.

Unfortunately, all these disclosures fail to teach individually or collectively suggest a back seat situated infant viewing system observable from a front rear-view mirror having portability, use universality, vibration secure without destructively altering the interior of the vehicle and visual obstruction exterior of the rear window.

SUMMARY OF THE INVENTION

A primary object of the present invention to provide a portable system for viewing an infant in the rear seat of a vehicle while enabling the driver of the vehicle to maintain proper eye contact with the road.

A secondary object of the present invention to provide a vehicle vibration secure system of the above type in which a driver utilizes his standard vehicle rear view mirror to view the infant in the back seat.

A third object of the present invention to use an adjustable reflector, such as a second mirror, disposed in the back seat to reflect the image of the infant to the rear-view mirror of the vehicle for viewing by the driver of the vehicle.

The fourth object of the present invention is to provide an easily to a reflector that reflects images of objects in a back seat that can be mounted against any inclined window headliner or ceiling headliner surface.

The fifth object of the present invention is to provide a reflector that reflects images of objects in a back seat that can be adjustably mounted to various height distances that exist between a rear seat backrest and a window headliner/ceiling.

The portable, universal system of the present invention is designed for viewing an infant in the rear seat of the vehicle and utilizes an infant imaging mirror mounted on an adjustable mast means between the back seat and roof of the vehicle to provide vibration security, said mirror adjustably alignable to the rear-view mirror for viewing by the driver of the vehicle. The upper portion of the mast means can pivot to any surface angle that exists in the window headliner and/or ceiling of the vehicle. The mast means can be made from a post that is telescopingly received in a cylinder, where the extended height of the post can be clipped in place and easily adjusted for varying heights that exist in different vehicles between the rear backseat and the window headliner and/or ceiling.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

First Embodiment

It is preferred to discuss the meanings of some words used herein including:

portable indicates that the device can be readily taken from one vehicle to and secured in another;

universal indicates that it can be used in any multi-seat vehicle;

non-destructive is the property of installation of the device in the vehicle without damage (penetration) to the interior of the vehicle as the headliner and seat bench; and, stable means that the device has the property of being secure against vehicular vibration.

All parts of the devices of the invention can be rounded with a large radius structure so as to reduce the potential for injury in the event of a crash or similar injury to the vehicle using the invention disclosed herein.

Figure 1A:
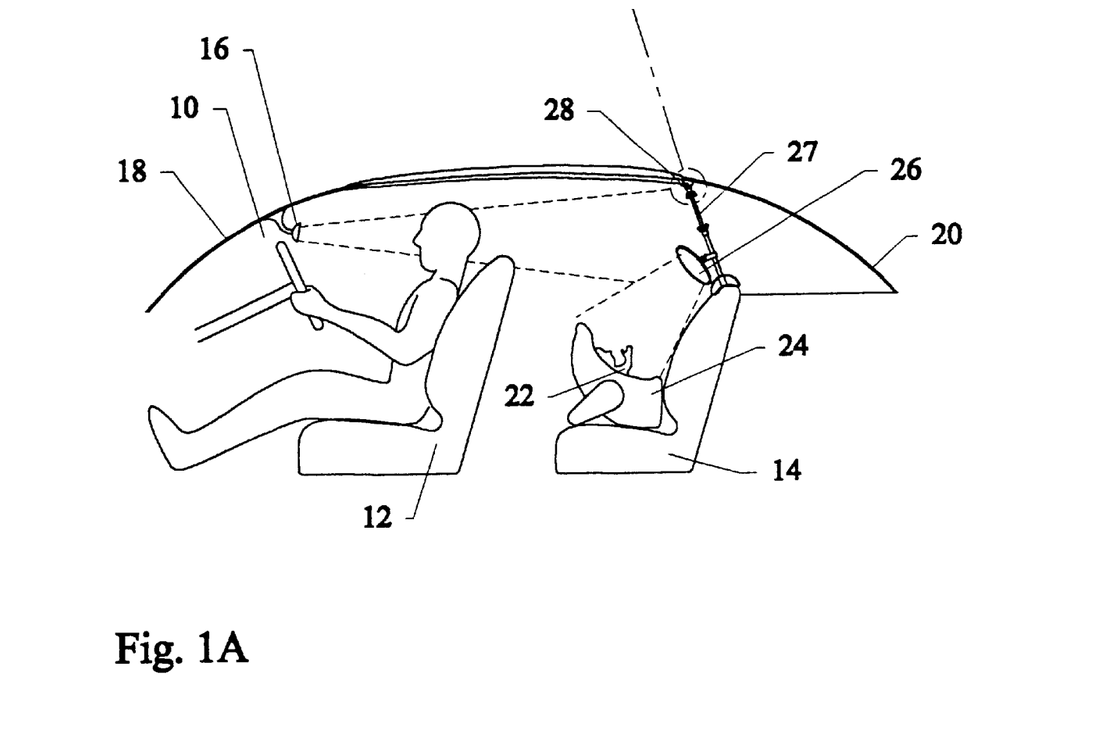
FIG. 1A is a side view, partly cut away, of a vehicle incorporating a mirror-positioned, length-adjustable mast placed between its rear seat and headliner according to the present invention.
Figure 1B:
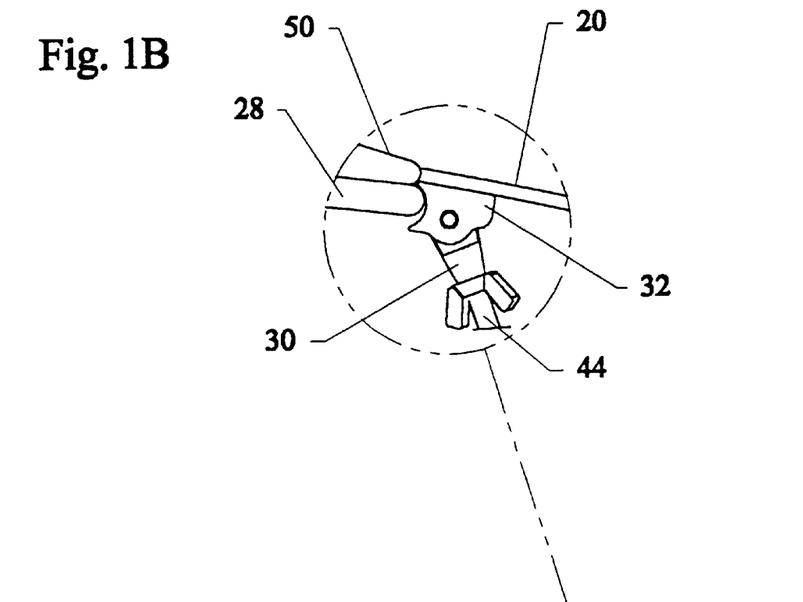
FIG. 1B is an exploded view of the securing of the mast against the headliner.

Referring specifically to FIGS. 1A–1B of the drawings, the numeral 10 refers in general to a vehicle having a front seat 12 and a rear seat 14. A standard rear view mirror 16 is mounted on the inner surface of the front window 18 and is designed to reflect images from the rear of the vehicle which pass through the rear window 20 during normal driving conditions.

The device of the invention enables the driver to view through the rear view mirror 16, an infant 22 disposed in the rear seat 14. For the purpose of this example, it is assumed that an infant 22 is disposed in a baby seat 24 placed on the seat portion of the rear seat 14 in a direction facing the rear of the vehicle 10 as shown.

To this end, a reflecting member, such as a mirror 26, is mounted to the back seat portion of the rear seat 14 and is designed to reflect the image of the infant 22 in the baby seat 24 to the rear view mirror 16 for direct viewing by the driver.

As earlier noted, FIG. 1A is a side view, partly cut away, of a vehicle 10 incorporating a mirror-positioned, length-adjustable mast 27 placed between its rear seat 14 and headliner 28 according to the present invention with an exploded view (FIG. 1B) of the securing of the mast 27 against the headliner 28.

The device of the invention thus from the bottom up has: a foot pad 41 which rests on the top of the back seat 14; a seat foot 39 into which is inserted the support tube 40 onto which is secured the mirror 26; the support tube 40 is capped with a shoulder cap 42 allowing the threaded rod 44 to telescope within it; and, with reference now to exploded view 1a, a swivel post 30 is threaded onto rod 44 at its upper end and is secured swivel 32 by means of spring pin 34 to the headliner foot pad 36 and foam pad 38 which presses against headliner 28 to secure the device.

Figure 2A:
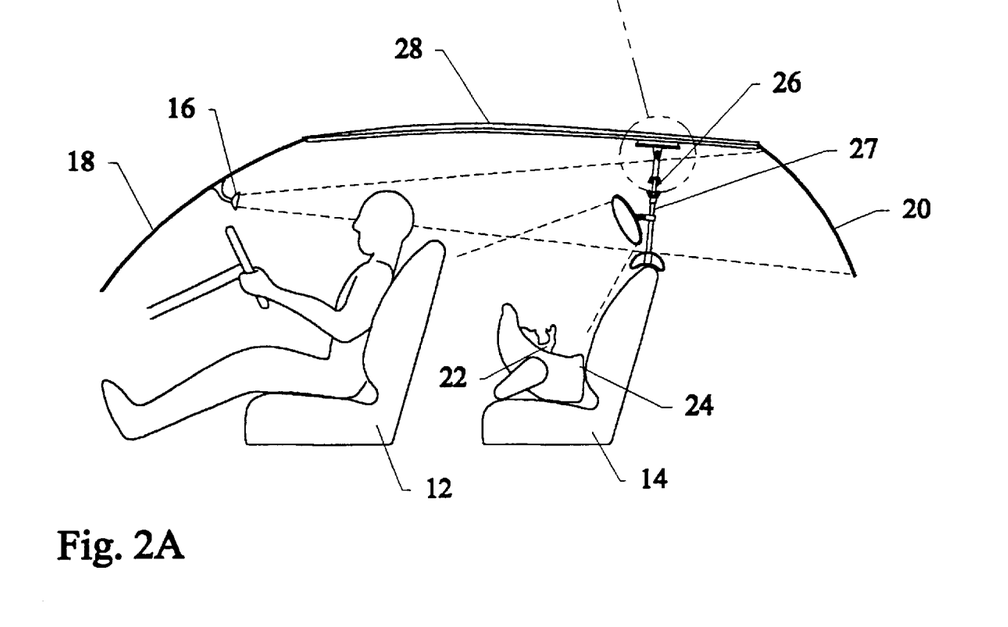
FIG. 2A is a similar view but only illustrating the rear segment of the vehicle of FIG. 1A with the mast alternatively placed between the rear seat and the rear window according to the present invention.
Figure 2B:
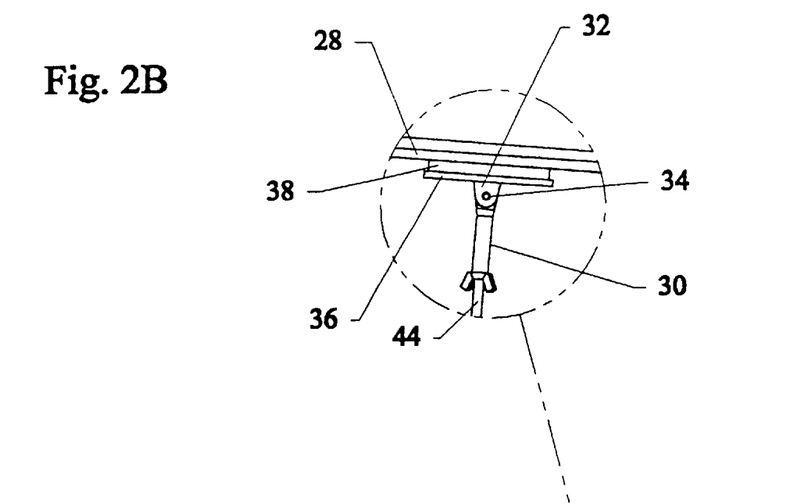
FIG. 2B is an exploded view of FIG. 2A showing the securing of the mast against the juncture of the headliner and rear window.

Referring now to FIG. 2A which is a similar view of an automobile as FIG. 1A but only illustrating the rear segment of the vehicle of FIG. 1A with the mast 27 alternatively placed between the rear seat 14 and the juncture of rear window 20 and the headliner 28 according to the present invention. The exploded view of FIG. 2B shows the securing of the mast 27 against the juncture of the headliner 28 and rear window 20.

In this drawing of FIG. 2A, the device of the invention is secured between the top of the back seat 14 to above discussed junction of the rear window 20 and the headliner 21. The seat foot 39 and associated foot pad 41 securely supports the support tube 40 with its shoulder cap 42 and the threaded rod 44. Looking now at the exploded view of FIG. 2B, it is seen that the threaded rod 44 is threaded into a swivel post 30 pinned by a spring pin 34 to swivel 32 sculpted to fit into the juncture of the rear window 20 and the headliner 28.

Figure 3:
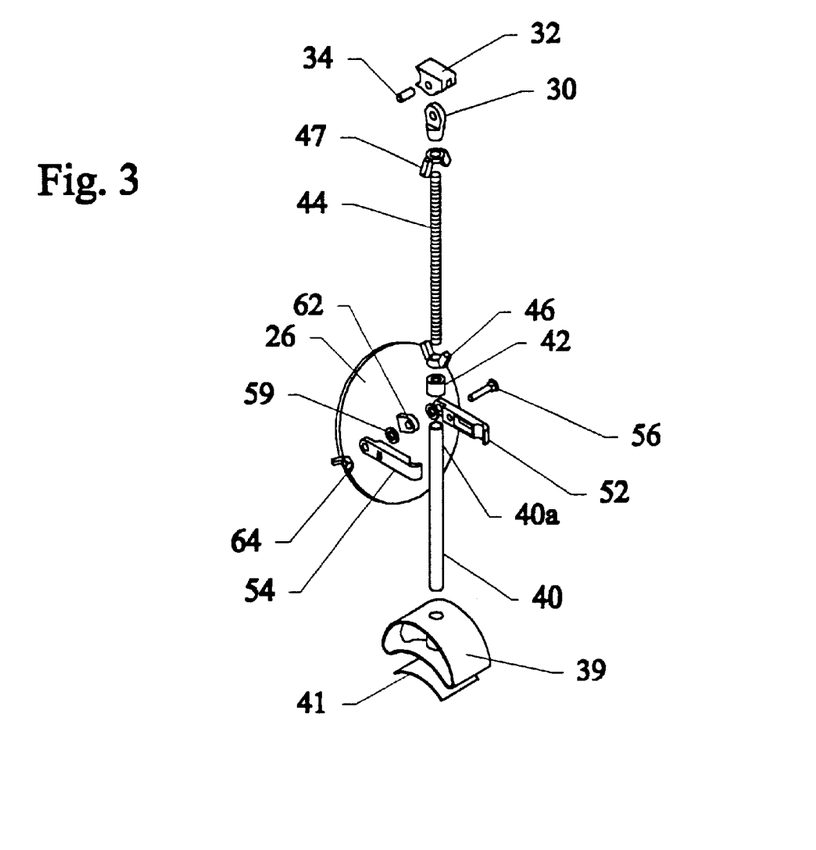
FIG. 3 is a side view of an assembled device of the invention which should be taken in consideration of the exploded view of FIG. 1B.

It is in FIG. 3 that a device of the invention is shown in full detail. This device as shown has from the bottom up: a foot pad 41 which rests on the top of the back seat 14; a seat foot 39 into which is inserted the support tube 40 onto which is secured the mirror 26; the support tube 40 is capped with a shoulder cap 42 allowing the threaded rod 44 to telescope within it; a lower wing nut 46 and an upper wing nut 47 are threadably positioned on the threaded rod 44; a swivel post 30 is telescoped onto the rod 44 which at its upper end is secured to the headliner foot pad 36 and foam pad 38.

Figure 4:
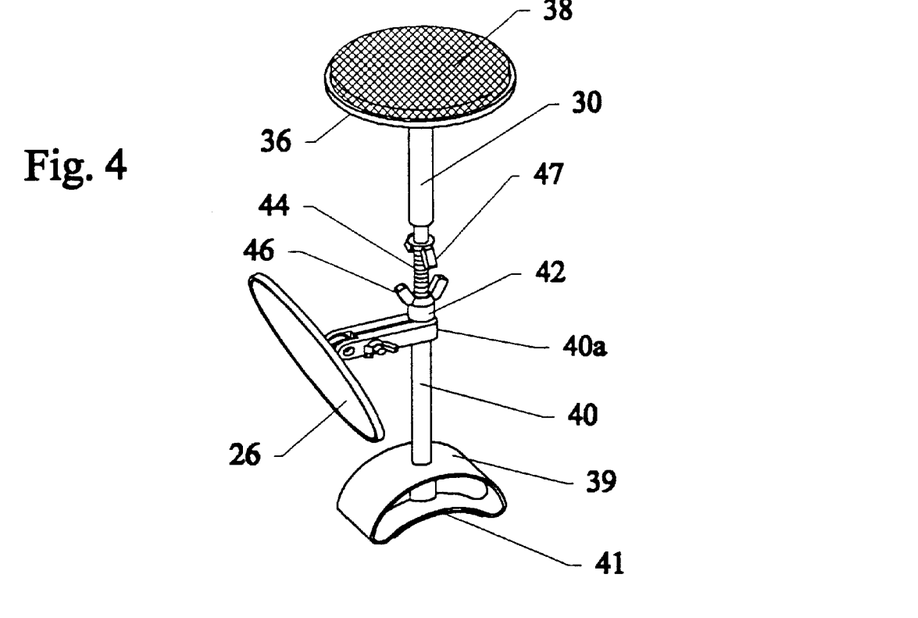
FIG. 4 is a fully exploded view of the device of the invention in the embodiment best suited for securing the device between the seat and the junction of the headliner and rear window as earlier discussed with respect to FIG. 2A.

In FIG. 4, a form of the device of the invention modified to be positioned between the top of the rear seat and the juncture of the rear window 20 and headliner 28 is set forth in exploded view.

Starting again from the bottom of the drawing of FIG. 4: the foot pad 41 rests against the top of the seat and cooperates with the seat foot 39 which in turn secures the support tube 40; the upper end 40a has a shoulder cap 42 into which the threaded rod 44 telescopes; the threaded rod 44 has a cooperating lower wing nut 46 and upper wing nut 47; a short swivel post 31 is threaded onto the upper end of the rod 44; and it in turn is pinned by spring pin 34 to the swivel 32 adapted to cooperate with the notch junction 50 of the headliner 28 and the rear window 20.

The mirror 26 is adjustably connected to the support tube 40 with the two cooperating clamp arms 52 and 54. The other ends of the arm are connected together via a carriage bolt 56 passing through the first arm 52 then the right washer 58 then the mirror spring pin 60 then the mirror back appendage 62 then the left washer 59, then the second arm 54 and finally secured with a wing nut 64.

Figure 5:
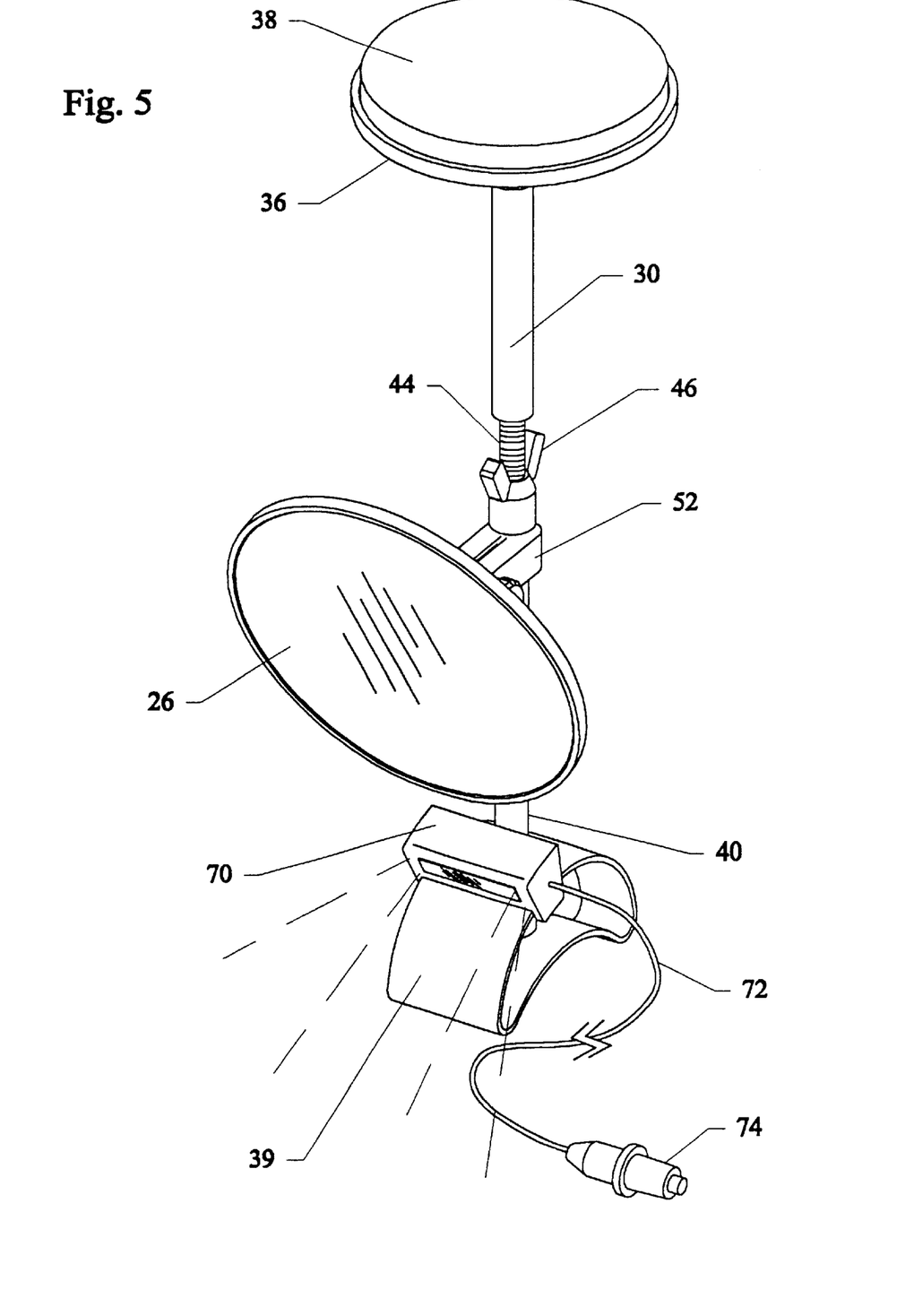
FIG. 5 shows a light for illumination of the infant.

If desired the infant can be readily illuminated with the light as illustrated in FIG. 5 secured to the device of FIGS. 1A and 3. For simplification, the numbers of FIG. 5 common to those of FIGS. 1A and 3 and represent the same elements. The light 70 is swivelly connected to the swivel tube 40 and secured (if desired) by the seat foot 39 so as to fully illuminate the infant. The light 70 is powered by means of a cord 72 connected to the cigarette lighter plug 74.

It is thus seen that many advantages result from the foregoing teachings. For example, the device of the present invention is fully portable and universal in application since it can be readily moved from vehicle to vehicle. It enables the driver of the vehicle to maintain eye contact with the road while he utilizes his standard vehicle rear view mirror to view the infant in the back seat and is able to view the highway to the rear without distortion or excessive obstruction. Further, the device is secured in the vehicle without destruction of any part of the interior of the vehicle. Finally, all edges of the appendages and supports are rounded and fabricated with large radius structures.

Second Embodiment

Figure 6:
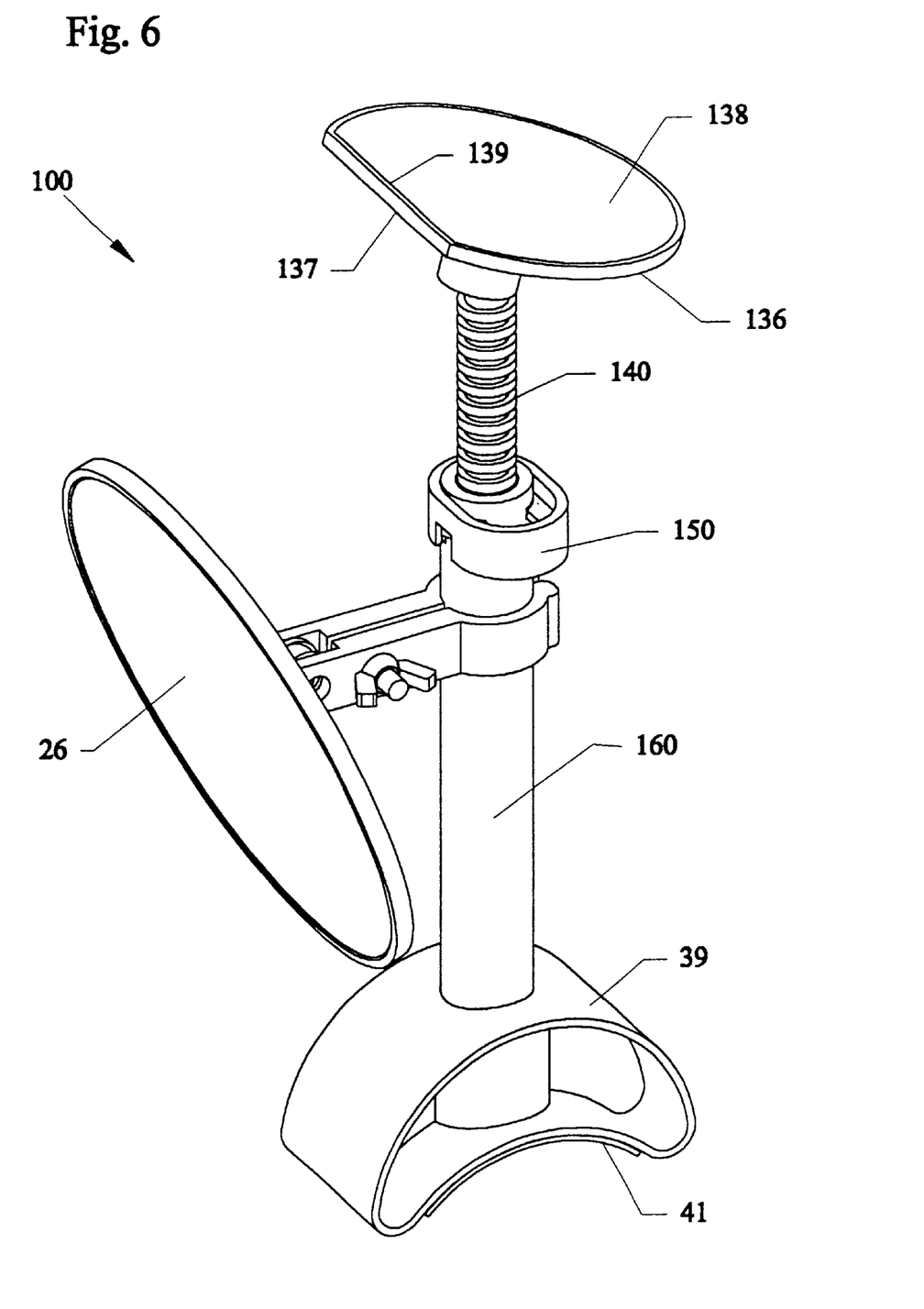
FIG. 6 is a perspective view of a second preferred embodiment of the invention.
Figure 7:
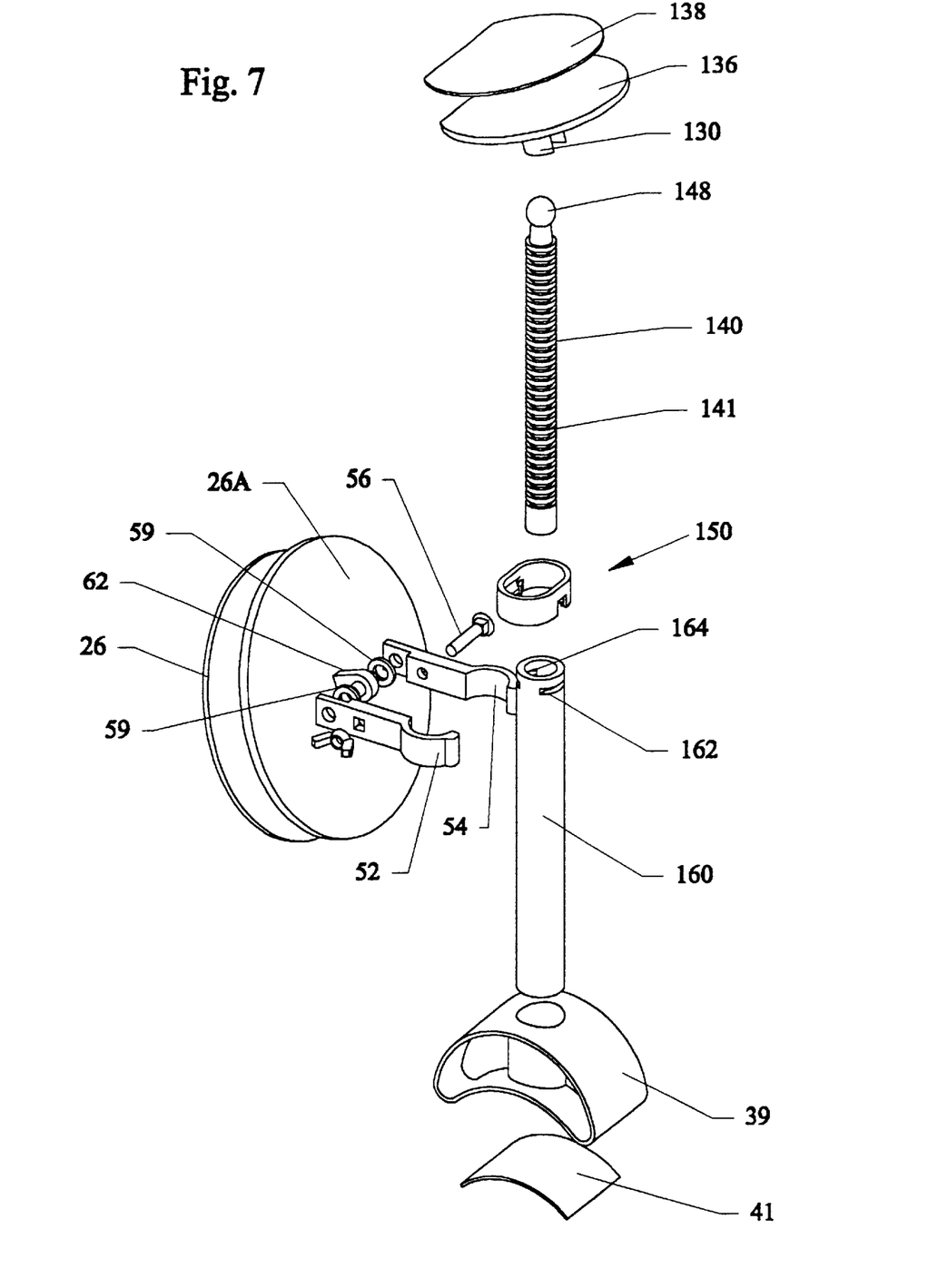
FIG. 7 is an exploded view of the embodiment of FIG. 6.

FIG. 6 is a perspective view of a second preferred embodiment 100 of the invention. FIG. 7 is an exploded view of the embodiment 100 of FIG. 6. Referring to FIGS. 6–7, component labels 26, 39, 41, 52, 54, 56, 59, 62 correspond to similar components from the preceding embodiment. 26A refer to a backing plate for the mirror 26. The upper portion of the mast support has a disc shaped headliner frame 136 with a flat edge 137, and a similar shaped headliner type pad 138 with similar flat edge 139 inserted therein, where the pad 138 is similar to the one described in reference to the first embodiment. The flat edges 137, 139 allow for the headliner 136 to substantially abut against a flat type window edge for a better fit, such as where the window meets the molding, or in an area of where the roof meets the window molding. Headliner 136, 138 is attached to the mast post 140 by a ball 148 and socket 130 connector that allows the headliner 136 to pivot along a 360 degrees to allow a better fit during installation that a single pivot hinge arrangement. The ball/socket pivot 130, 148 allows for the headliner plate 136 to conform to any angle of where the rear window meets a headliner molding, and/or for any sloped angle of a vehicle's roof.

Figure 8A:
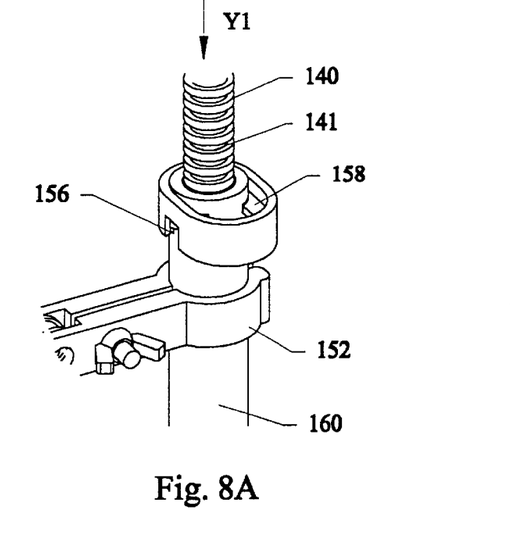
FIG. 8A is an enlarged view of the clip of the second embodiment in an unlock position.
Figure 8B:
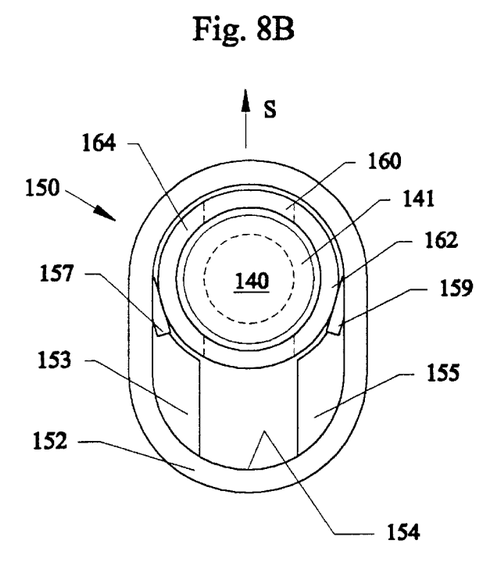
FIG. 8B is a top view of FIG. 8A along arrow Y1.

FIG. 8A is an enlarged view of the clip 150 of the second embodiment 100 in an unlock position. FIG. 8B is a top view of FIG. 8A along arrow Y1. Referring to FIGS. 7, 8A and 8B, clip 150 includes an external oval frame 152 with two inwardly facing flange rails 153, 155 separated by a space 154 near a lower portion of the clip 150. On opposite sides of a midportion of the clip 150 can be two inwardly facing spring tabs 157, 159, which are formed from cut-outs 156, 158 in the sides of the clip 150. Since the spring tabs 157, 159 are wider than the groove cut-outs 164, 162 of the hollow post 160, the spring tabs 157, 159 initially press against the sides of the hollow post 160 above and below the groove cut-outs 164, 162 of the hollow post 160 thus holding the clip 150 in place about the hollow post 160.

Figure 9A:
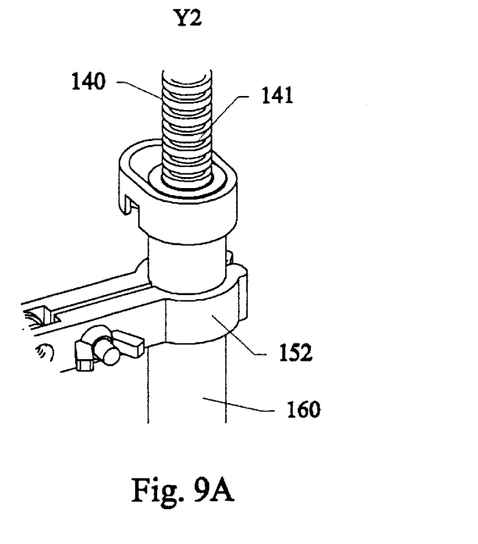
FIG. 9A is an enlarged view of the clip of the second embodiment in a locked position.
Figure 9B:
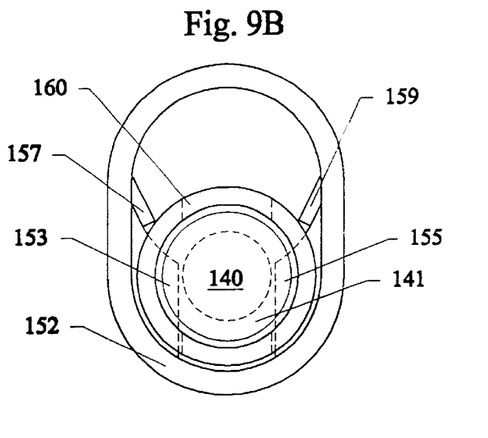
FIG. 9B is a top view of FIG. 9A along arrow Y2.

FIG. 9A is an enlarged view of the clip of the second embodiment 100 in a locked position. FIG. 9B is a top view of FIG. 9A along arrow Y2. Referring to FIGS. 8A, 8B, 9A and 9B, when clip 150 is moved in the direction of arrow S, rails 153, 155 of clip 150 slide within groove cut-outs 164, 162 of hollow post 160 and into selected circular groove 141 of mast 140 locking the mast 140 to the hollow post 160. Picking different circular grooves 141 along the mast 140 allows for the mast 140 to have various heights relative to the hollow post. Thus, the height of the mast can vary on depending on the different heights between vehicle backseats and the window/headliner and ceiling/headliner surfaces.

The components of the invention such as the masts and hollow posts, and the like, can be formed from injection molded plastic, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A portable and non-destructive device for viewing an infant in the rear seat of a vehicle by utilizing a mirror mounted on a mast supported on the backseat of said rear seat for reflecting the image of said infant to the vehicle's rear view mirror comprising:

a rod which telescopes into an upper end of a support tube, the rod and the support tube together forming the mast, with the mirror adjustably mounted on the mast;

means for mounting a lower end of the mast on a portion of the backseat; and a means for non-destructively securing an upper end of mast to the headliner of said vehicle.

2. The device of claim 1, further comprising:

a clip for locking the rod and the tube to a selected length.

3. The device of claim 2, wherein the clip further includes:

at least one inwardly protruding portion which fits into a groove in the side of the rod.

4. The device of claim 1, wherein said non-destructive securing means comprises:

a pad; and means for pivotally attaching the pad to the upper end of the mast.

5. The device of claim 4, wherein the pivotal means includes:

a ball and socket.

6. The device of claim 4, wherein the pad is a window pad.

7. The device of claim 4, wherein the pad is a headliner pad.

8. A device which enables front seated drivers of a vehicle to monitor a space between a rear seat backing and a front seat backing, comprising:

a height adjustable support having an upper end and a lower end;

a mirror attached to the support;

a seat foot secured to the lower end of the support; and means for securing the upper end of the support to a portion of a headliner of said vehicle.

9. The device of claim 8, further comprising: a seat pad on the seat foot.

10. The device of claim 8, wherein the securing means includes: a non-destructive means.

11. The device of claim 10, wherein the non-destructive means includes: a pad.

12. The device of claim 10, wherein the non-destructive means includes:

a portion of foam.

13. The device of claim 8, wherein the securing means further includes:

a ball and socket for allowing the securing means to pivot relative to the support.

14. The device of claim 8, wherein the height adjustable support includes:

non threaded grooves spaced apart from one another, wherein each of the grooves corresponds to a different support height.

15. The device of claim 14, further comprising:
a clip for locking into one of the grooves.

16. A device for viewing space behind a front seat in a vehicle, comprising:
   a support extendable to selected lengths, having an upper end and a lower end;
   a mirror attached to the support;
   first means for non-destructively securing the lower end of the support to a back seat; and
   second means for non-destructively securing the upper end of the support to a portion of a headliner of said vehicle.

17. The device of claim 16, wherein the support includes:
a rod telescoping received within a tube.

18. The device of claim 17, further comprising:
a clip for locking the rod relative to the tube to a selected position.

19. The device of claim 16, wherein at least one of the first means and the second means includes: a ball and socket.

* * * * *